(12) United States Patent
Thomas

(10) Patent No.: US 7,134,130 B1
(45) Date of Patent: Nov. 7, 2006

(54) APPARATUS AND METHOD FOR USER-BASED CONTROL OF TELEVISION CONTENT

(75) Inventor: Keith C. Thomas, Vermillion, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/211,730

(22) Filed: Dec. 15, 1998

(51) Int. Cl.
*H04N 7/16* (2006.01)

(52) U.S. Cl. ......................................... 725/25; 725/12
(58) Field of Classification Search ................. 725/25, 725/27–31, 14, 20, 34, 35, 46; 713/200
See application file for complete search history.

(56) References Cited

U.S. PATENT DOCUMENTS

| | | | |
|---|---|---|---|
| 5,001,554 A | 3/1991 | Johnson et al. ............... 358/86 |
| 5,031,228 A | 7/1991 | Lu ................................ 382/38 |
| 5,046,093 A | 9/1991 | Wachob ........................ 380/20 |
| 5,164,992 A | 11/1992 | Turk et al. ...................... 382/2 |
| 5,231,494 A * | 7/1993 | Wachob ....................... 358/146 |
| 5,477,262 A | 12/1995 | Banker et al. .................. 348/7 |
| 5,550,928 A | 8/1996 | Lu et al. ...................... 382/116 |
| 5,619,251 A | 4/1997 | Kuroiwa et al. ............... 348/12 |
| 5,758,257 A * | 5/1998 | Herz et al. ................... 725/116 |
| 5,771,307 A * | 6/1998 | Lu et al. ...................... 382/116 |
| 5,977,964 A * | 11/1999 | Williams et al. ............. 345/327 |
| 6,002,427 A * | 12/1999 | Kipust ......................... 348/156 |
| 6,065,056 A * | 5/2000 | Bradshaw .................... 709/229 |
| 6,115,079 A * | 9/2000 | McRae ........................ 348/731 |
| 6,181,364 B1 * | 1/2001 | Ford ............................ 725/32 |
| 6,359,661 B1 * | 3/2002 | Nickum ....................... 348/734 |
| 6,467,089 B1 * | 10/2002 | Aust et al. ..................... 725/13 |
| 6,530,083 B1 * | 3/2003 | Liebenow .................... 725/46 |

* cited by examiner

*Primary Examiner*—Andrew Y. Koenig
(74) *Attorney, Agent, or Firm*—Ross F. Hunt, Jr.; Sties & Harbison PLLC; Jeffrey A. Proehl

(57) ABSTRACT

An apparatus and method for controlling access to information based on content of the information and user identity. The apparatus includes a video display that displays the information to be viewable by one or more users. A user-recognition input device determines that an additional user is newly present in a given area having access to the display. A blocking device coupled to the user-recognition input device selectively blocks display of the information based on whether the additional user is newly present. In one embodiment, the user-recognition input device includes a video input device, and a feature recognition device operable to distinguish between two or more users based on one or more video features of the users. In another embodiment, the user-recognition input device includes an audio input device, and an audio feature recognition device operable to distinguish when an additional user arrives. In yet another embodiment, the user-recognition input device includes a movement-detection device operable to distinguish when an additional user arrives.

35 Claims, 3 Drawing Sheets

APPARATUS AND METHOD FOR USER-BASED CONTROL OF TELEVISION CONTENT

FIELD OF THE INVENTION

The present invention is related to control of video display output, and in particular, to an apparatus and method for controlling television or personal computer output based on the suitability of the e.g., television programming content for each of the users present in a room.

BACKGROUND OF THE INVENTION

Television and other video presentations (including, for example, computer screens) often contain content or material that is unsuitable for viewing by certain users. Conventional means for restricting user access to certain content include locks that prevent tuning to certain channels by unauthorized users. For example, many parents would like to prevent their young children from viewing programming that is oriented towards adults, particularly programming that includes violent or sexual content. Channel locks that prevent tuning to certain channels without a password, but once unlocked, manual intervention is required to prevent the viewing of a channel's content by persons for whom that content is unsuitable.

U.S. Pat. No. 5,031,228, which is hereby incorporated by reference, describes an image recognition system for identifying each of a plurality of patterns in an image, such as the individual faces of members of an audience. For example, predetermined individual members of a television viewing audience in a monitored area can be identified, in order to determine the viewing habits of each individual in a household.

U.S. Pat. No. 5,164,992, which is hereby incorporated by reference, describes an image recognition system for identifying members of an audience by resemblance to one of a reference set of face images of individuals.

U.S. Pat. No. 5,619,251, which is hereby incorporated by reference, describes a system for two-way CATV and remote control. One embodiment includes a parental-control unit which controls whether a specific program is decoded from a television signal that has a jamming signal.

Thus there is a need for automatic and easier ways to control access to television programming and computer-displayed information based on which users are present in the room having the television or display.

SUMMARY OF THE INVENTION

An apparatus and method for controlling access to information based on content of the information and user identity. The apparatus includes a video display that displays the information to be viewable by one or more users. A user-recognition input device determines that an additional user is newly present in a given area having access to the display. A blocking device coupled to the user-recognition input device selectively blocks display of the information based on whether the additional user is newly present.

In one embodiment, the user-recognition input device includes a video input device, and a feature recognition device operable to distinguish between two or more users based on one or more video features of the users.

In another embodiment, the user-recognition input device includes an audio input device, and an audio feature recognition device operable to distinguish when an additional user arrives.

In yet another embodiment, the user-recognition input device includes a movement-detection device operable to distinguish when an additional user arrives.

Another aspect of the present invention provides an apparatus that includes a video display, a user-recognition input device that determines which users are present in a given area having access to the display and provides one or more values that correspond to the identities of the users, a memory containing information that identifies a video content that is being displayed on the video display, and information specifying which users are to be permitted access to that content, a processor that compares a user-identity value from the input device to the memory content specifying which specifies which users are to be permitted access to that content and that produces an access-allowed indication based on that comparison, and a blocking device coupled to the processor that selectively blocks display of the content based on the access-allowed indication.

Yet another aspect of the present invention provides a method for controlling access to information based on content of the information and user identity. The method includes the steps of displaying video information, determining that an additional user is present in a given area having access to the display, storing information that identifies a video content that is being displayed on the video display, and information specifying which users are to be permitted access to that content, comparing compares a user-identity value from the input device to the memory content specifying which specifies which users are to be permitted access to that content and producing an access-allowed indication based on that comparison, and selectively blocking display of the content based on the access-allowed indication.

In one embodiment of the method, the video content is television programming. In another embodiment of the method, the video content is computer-displayed text or graphics.

In one embodiment of the method, the step of determining includes acquiring video input, and performing feature recognition to distinguish between two or more users based on one or more video features of the users.

In another embodiment of the method, the step of determining includes acquiring audio input, and performing feature recognition operable to distinguish when an additional user arrives.

In yet another embodiment of the method, the step of determining includes detecting movement to distinguish when an additional user arrives.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digits of reference numbers appearing in the Figures generally correspond to the Figure number, with the exception that the same reference number is used throughout to refer to an identical component which appears in multiple Figures. Signals and connections may be referred to by the same reference number or label, and the actual meaning will be clear from its use in the context of the description.

Figure 1:
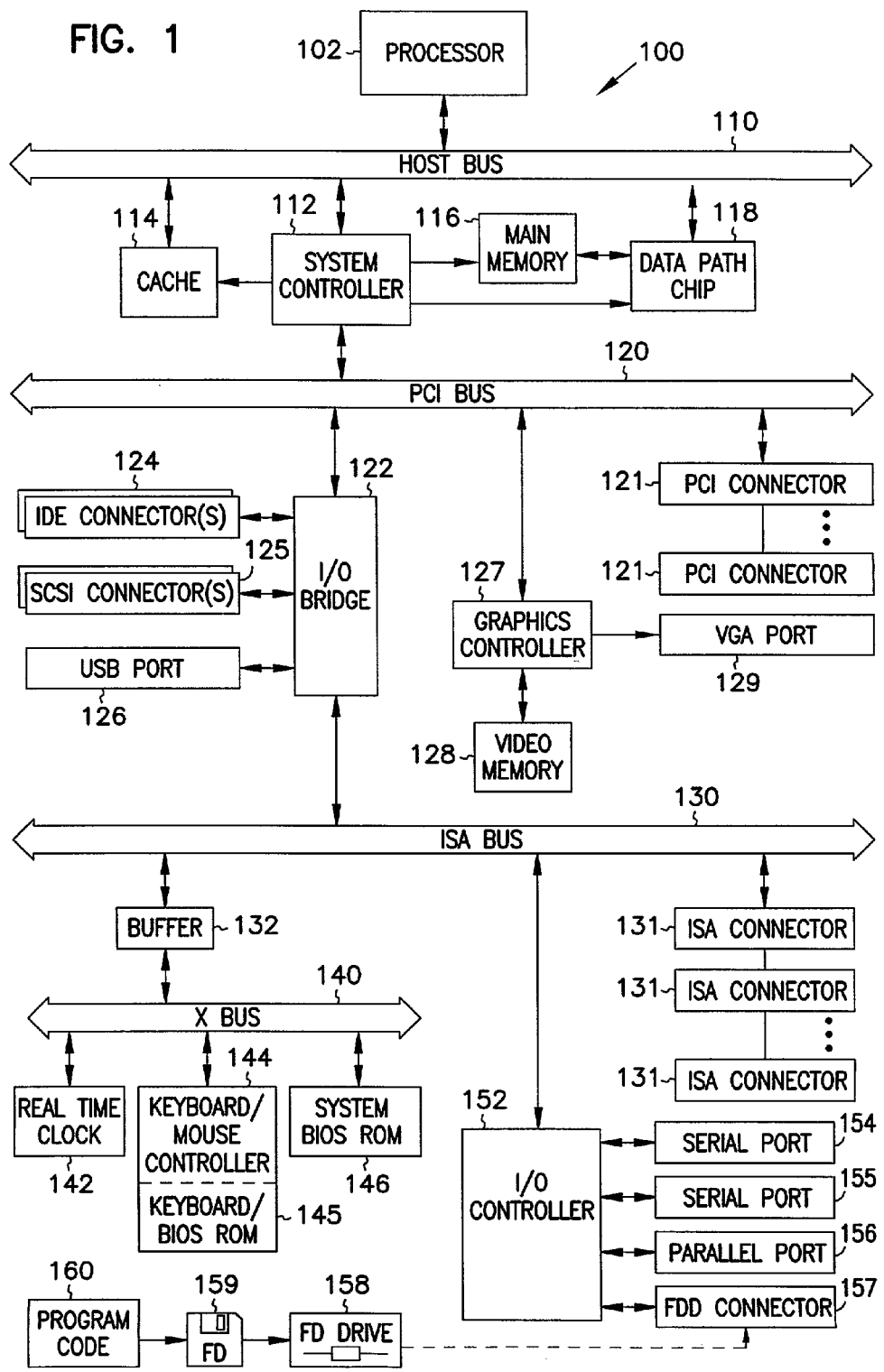
FIG. 1 is a block diagram of a computer system according to the present invention.

FIG. 1 shows a block diagram of a computer system 100 according to the present invention. In this embodiment, processor 102, system controller 112, cache 114, and data-path chip 118 are each coupled to host bus 110. Processor 102 is a microprocessor such as a 486-type chip, a Pentium®, Pentium II® or other suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 112 (i.e., in the near future). Main memory 116 is coupled between system controller 114 and data-path chip 118, and in one embodiment, provides random-access memory of between 16 MB and 128 MB of data. In one embodiment, main memory 116 is provided on SIMMS (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as video, disk, network, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHZ. In another embodiment, PCI bus 120 provides a 64-bit-wide data path that runs at 33 MHZ. In yet other embodiments, PCI bus 120 provides 32-bit-wide or 64-bit-wide data paths that runs at higher speeds. In one embodiment, PCI bus 120 provides connectivity to I/O bridge 122, graphics controller 127, and one or more PCI connectors 121, each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to VGA-type or SVGA (Super VGA)-type displays. Other input/output (I/O) cards having a PCI interface can be plugged into PCI connectors 121.

FIG. 1 shows a block diagram of a computer system 100 according to the present invention. In this embodiment, processor 102, system controller 112, cache 114, and data-path chip 118 are each coupled to host bus 110. Processor 102 is a microprocessor such as a 486-type chip, a Pentium®, Pentium II® or other suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 112 (i.e., in the near future). Main memory 116 is coupled between system controller 114 and data-path chip 118, and in one embodiment, provides random-access memory of between 16 MB and 128 MB of data. In one embodiment, main memory 116 is provided on SIMMS (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHZ. In another embodiment, PCI bus 120 provides a 64-bit-wide data path that runs at 33 MHZ. In yet other embodiments, PCI bus 120 provides 32-bit-wide or 64-bit-wide data paths that runs at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, FDD connector 157 is connected to FDD 158 that receives removable media (floppy diskette) 159 on which is stored data and/or program code 160. In one such embodiment, program code 160 includes code that controls programmable system 100 to perform the method described below. In another such embodiment, serial port 154 is connectable to a computer network such as the internet, and such network has program code 160 that controls programmable system 100 to perform the method described below. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of the present invention, however other bus structures and memory arrangements are specifically contemplated.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives or CDROM (Compact Disk-Read-Only Memory) drives, and similarly IDE connector 125 provides connectivity for up to two IDE-type devices. In one such embodiment, IDE connectors 124 and 125 each provide the EIDE (Enhanced IDE) architecture. In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

Figure 2:
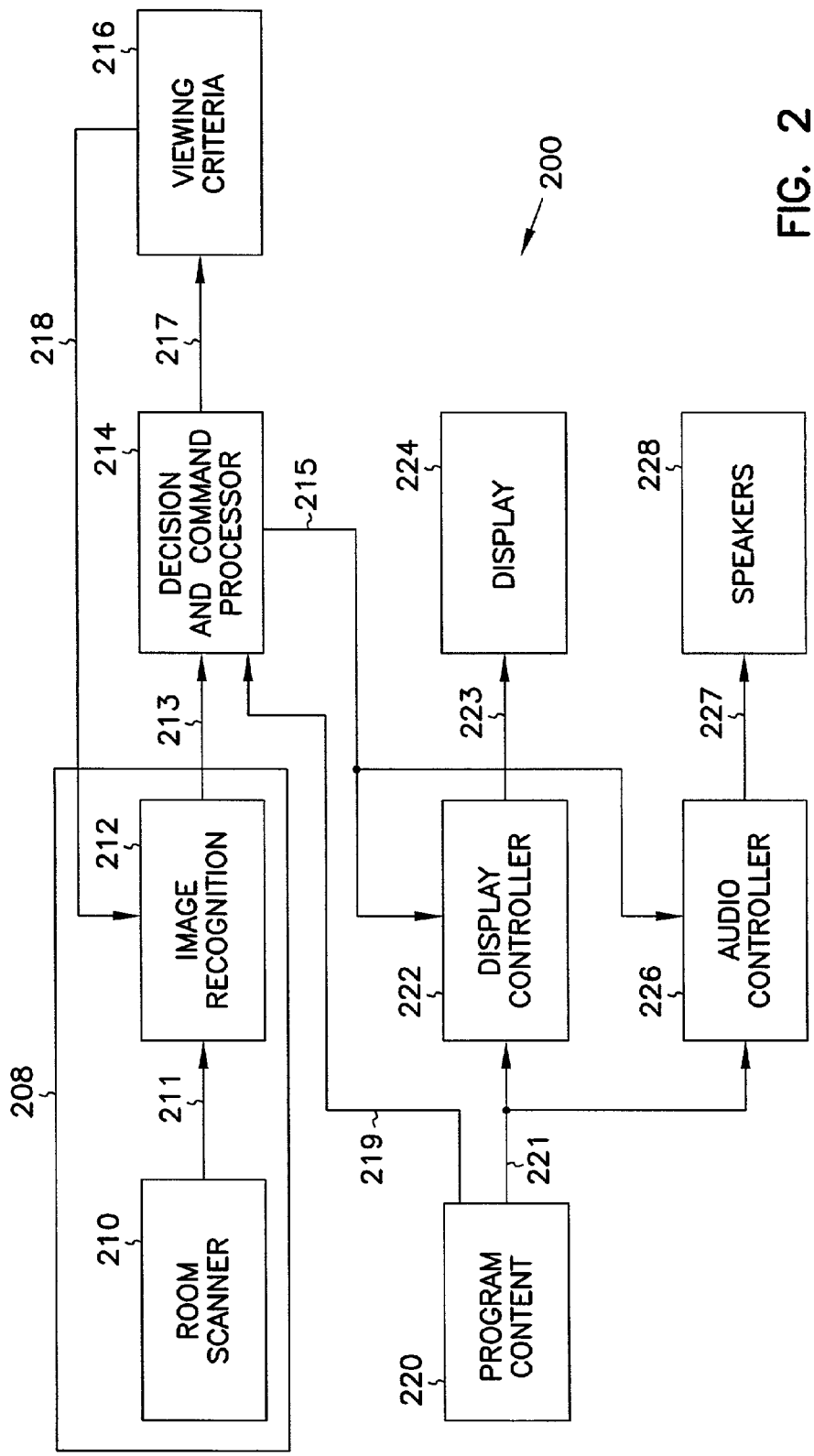
FIG. 2 is a representation of a user-based control system 200 of the present invention.

FIG. 2 is a representation of a user-based control system 200 of the present invention. According to the invention, apparatus 200 allows controlling access to information based on content of the information and user identity. The information to be controlled 221 can include video such as a television signal from any source such as broadcast, cable, satellite, recorded video tape or digital video disk (DVD), audio from any such source, computer screen (image or text) or audio information from a computer program, CDROM, DVD, a dial-up bulletin board or the internet, or any other information that can be displayed (such as on a video or LCD screen) or played (such as by speakers). The "user identity" can be specific identity, such as identifying that an individual person among a set of individuals is present in an area (for example, recognizing the individual's facial features or hair color);

criteria identity, such as determining whether a person meeting or not meeting a set of criteria is present in an area (for example, determining that a person is present who is shorter or smaller than a predetermined criteria, or who is male or female, etc.);

exclusionary identity, such as determining that someone who is not in the set of allowed individuals is present in the area (for example, determining that a face or hair color is outside the predetermined set of allowable faces or hair colors, or is unrecognized); or presence identity, such as determining that the number or persons in the area has changed (for example, that an additional someone has newly become present in the area, or that a certain count of persons is present).

According to the present invention, it is desirable to prevent the visual display or audio playing of certain types of information to persons outside a predetermined set of allowed persons (or to persons inside a predetermined set of disallowed persons). For example, many parents would like to prevent their young children from viewing programming that is oriented towards adults, particularly programming that includes violent or sexual content. On the other hand, such programming is acceptable viewing for the parents, so total exclusion is not desired. Channel locks that prevent tuning to certain channels without a password, but once unlocked, manual intervention is required to prevent the viewing of a channel's content by persons for whom that content is unsuitable. The present invention provides the ability to automatically block or terminate the display or playing of such material when someone outside the predetermined allowed audience is present.

Other situations where it is desirable to control viewing of a display's content include environments where sensitive material is on computer displays that could inadvertently or surreptitiously be viewed by persons without proper security clearance walking into a room or area with that display. Examples include computer displays showing highly sensitive text content such as personnel or salary records, medical records, government secrets, sensitive financial information (such as at automatic teller machines wherein an outside party is standing too close to the person performing a transaction). Other computer-output situations include playing of adult-oriented computer games, or even internet downloads and displays of adult-oriented content. Quite often, it is difficult for an authorized user to manually block or change the displayed content quickly enough to prevent unauthorized or undesired viewing of the material by another person who arrives during viewing, or who might come into a room when the user temporarily leaves the room. The present invention provides the ability to automatically block or terminate the display or playing of such material when someone outside the predetermined allowed audience is present.

In another embodiment, the present invention provides the ability to control and charge for pay-per-view reception, for example, by counting the number of viewers or determining the makeup of the audience, and charging a fee based on the total number of viewers, or on the number of children and the number of adults.

In FIG. 2, user-based control system 200 includes a room scanner 210 that outputs signal 211. Image recognition device 212 processes signal 211 and outputs recognition signal 213. Decision and command processor 214 processes recognition signal 213 according to viewing criteria signal 217 from stored viewing criteria 216, and decision and command processor 214 generates a control signal 215. In one embodiment, control signal 215 is based solely on recognition signal 213 (i.e., if anyone outside the allowed set of persons is present, the image and/or sound will be blocked, regardless of the program content). In another embodiment, program content 220 provides a content-indication signal 219 indicative of the type of content in the program material (e.g., whether there is sexual or violent content, and the degree of such content, or whether the content is secret or sensitive, in the case of textual or numerical data output from a computer program, etc.), and based on the content type of the programming material or computer information of the program content 220 as well as on recognition signal 213, decision and command processor 214 generates a control signal 215.

In one such embodiment, a content-type signal 219 that changes over the timespan of the program material is provided (i.e., the content type is synchronized with the content), and is used to "bleep" certain objectionable images or sounds (e.g., to block or skip nudity, violence, or profanity) while allowing the display and audio playing of all of the rest of the program material. In one such embodiment, the playing of a video game (i.e., action and content) is modified based on who is or is not in the monitored room or area, thus allowing or blocking, for example, gruesome or violent aspects of the game for young children.

Program content 220 provides signal 221 that includes but is not limited to video and audio, text, numerical data, and program control information. Video and audio sources such as a television signal can come from any source such as broadcast, cable, satellite, recorded video tape or digital video disk (DVD), audio from any such source, computer screen (image or text) or audio information from a computer program, CDROM, DVD, a dial-up bulletin board or the internet, or any other information that can be displayed (such as on a video or LCD screen) or played (such as by speakers). Text and numerical data include such sources as internet or database information, personnel records, bank data, and program output data.

Program control information control the generation of program material, for example, parameters that game playing or outcome, as opposed to the video or audio output of the game; for example, based on which persons are present, such parameters would control the flow of the game and the presence of gruesome monster characters or blood-spattering explosions or romantic encounters, and thus rather than entirely blocking video output, the output content type is modified to be suitable for the audience present before it is generated.

The apparatus 200 includes a video display 224 and/or and audio output device 228 that displays or plays the information to be viewable or audible by one or more users. A user-recognition input device 212 determines that an additional user is newly present in a given area having access to the display. A control device 222 coupled to the user-recognition input device selectively controls display of the information based on whether the additional user is newly present.

In various embodiments, the user recognition input device is implemented in quite different ways, to match the cost and accuracy requirements of a particular application. For example, in one embodiment, room scanner 210 includes a video camera that acquires an image of the monitored area or room, and image recognition device 212 includes a software-program-controlled image recognition processor. Viewing criteria 216 includes a predetermined set of stored image parameters (used to identify particular individuals from a set) that are passed by signal 218 to image recognition device 212. In such a system, facial features or hair color or a person's height or size or any other suitable parameter is used to recognize individuals from a set of persons. In one such embodiment, signal 213 provides an indication of the identity of an individual or of each individual in the monitored area to decision processor 214. In one embodiment, persons are identified only as they enter or leave the room, and an indication of the people who are in the room is maintained by adding identities as people enter the room or subtracting identities as people leave the room. In another embodiment, the room is constantly scanned to determine the audience at each scan time.

In some embodiments, content-type signal 219 provides a synchronized moment-to-moment content type indication for the program content, and decision and command processor 214 blocks, skips, or "bleeps" based on the content type and the set of persons in the current audience. For example, if only a few scenes of a movie cause its "R" (restricted) rating but the rest of the movie would qualify for a "PG" (parental guidance) or "G" (general audiences), the synchronized content-type signal 219 would indicate R only during the times when R-rates scenes were playing, and would provide a PG or G rating for the other portions as appropriate. Thus, a program that has only a few objectionable portions for particular children can be watched by any subset of the audience, and only those objectionable portions are blocked or skipped, and only then if non-allowed persons are present.

The term "blocking" as used herein refers to preventing the signal from being recognizably displayed (either by totally blocking the signal, or by replacing the signal with another signal (e.g., switching channels) or by blocking only certain portions of the display, for example by increased granularity or noise or scrambling (e.g., of the type used to protect the identity of persons on certain "Cops"-type shows), or by decreased focus or other suitable artifact to prevent the viewing of the protected portion of the signal). The term "skipping" as used herein refers to skipping over those times or portions of a program or movie. Skipping is useful for preventing undesirable gaps when viewing a movie or program that has relatively short periods of time which would be blocked if certain non-allowed persons were present, and such blocked gaps are compressed in time or eliminated by skipping them (e.g., by fast-forwarding a video tape or skipping tracks or sectors on a DVD). The term "program content alteration" refers to altering the content type of a program content. For example, in one embodiment, program content alteration is achieved by recording alternate scenes for a movie (e.g., one scene to be played when the "R" rated, another scene to be played when the "PG" rated, and a third scene to be played when the "G" rated; the appropriate scene for the rating desired is selected based on the audience detected as present, and the other scenes are skipped). In another embodiment, a computer game program has playing parameters selected based on the audience detected as present (e.g., presence of gruesome monster characters or violence or sexual encounters, or the difficult of play, and thus rather than entirely blocking video output, the output content type is modified to be suitable for the audience present as it is generated).

In other embodiments, signal 219 provides a single content type indication for the entire program content, and decision and command processor 214 blocks, skips, or "bleeps" based on the content type of the entire program and the set of persons in the current audience at a particular time. In such a system, the entire movie would have, e.g., an "R" rating. No portion of the program would be displayed or played is a non-allowed person was present. In one such embodiment, the video and audio would be enabled by an allowed person (e.g., a parent), for example, by using a password. The video and audio would remain enabled unless and until a non-allowed person entered the room, and upon such event, the video and/or audio would be automatically blocked using signal 215. In one such embodiment, the place in the program content is saved (e.g., by stopping the playing of a video tape, or by saving the track of a DVD disk), such that the displaying/playing of controlled program content can be resumed at the point at which the interruption occurred (e.g., the parents would not miss any of the movie due to the child's temporary presence). Thus if a child, for example, entered the room unnoticed or unannounced to the parent, the system 200 would automatically enforce the wishes of the parent to prevent such program content from reaching the child. In one embodiment, once the child left, system 200 would automatically re-enable the video and audio. In another such embodiment, the allowed person would need to intervene and assist in re-enabling the video and audio (e.g., by re-entering the password, or restarting the video tape player).

In one embodiment, the user-recognition input device 208 includes a video input device 210 operable to capture an image, and a feature recognition device 212 operable to distinguish between two or more users based on one or more video features of the users. In one embodiment, video input device 210 operates to acquire a continuous series of video frames (i.e., a moving picture that captures an indication of motion or movement). In another embodiment, video input device 210 operates to acquire a single frame or a series of asynchronous video frames (i.e., isolated still pictures). Video input device 210 thus includes any device that is capable of capturing an image for analysis.

In another embodiment, the user-recognition input device 208 includes an audio input device 210 operable to detect sounds in the monitored area or room, and an audio feature recognition device 212 operable to distinguish when an additional user arrives, by using signals derived from sounds.

In yet another embodiment, the user-recognition input device 210 includes a movement-detection device (such as are commonly available to automatically turn on lights based on detected movements of a person in a "scanned" area) operable to distinguish when an additional user arrives. In one such embodiment, no image recognition or detection as such is performed by image recognition device 212, but rather merely the detection of motion drives signal 213. For example, such a motion detector 210 is located to detect motion in one portion of a room (e.g., at or near a doorway) while ignoring motions of the allowed persons in the viewing portion of the monitored room. In another such embodiment, a motion detector 210 is used that distinguishes speed or distance of movement and monitors an entire room; thus allowed persons are those who are sitting quietly or not moving very far or fast, and non-allowed persons are those who are walking or moving more quickly or far to enter the room.

Another aspect of the present invention provides an apparatus 200 that includes a video display 224, a user-recognition input device 208 that determines which users are present in a given area having access to the display 224 and provides one or more values 213 that correspond to the identities of the users, a memory 220 containing information that identifies a video content-type that is being displayed on the video display 224, and information 216 specifying which users are to be permitted access to that content type (or of various content types), a processor 214 that compares a user-identity value from the input device to the memory content specifying which specifies which users are to be permitted access to that content and that produces an access-allowed indication 215 based on that comparison, and, in one embodiment, a blocking device coupled to the processor that selectively blocks display of the content based on the access-allowed indication (and, in another embodiment, a skipping device coupled to the processor that selectively skips display of the content based on the access-allowed indication, and, in still another embodiment, a content-type-control device coupled to the processor that selectively controls display of the content based on the access-allowed indication).

Figure 3:
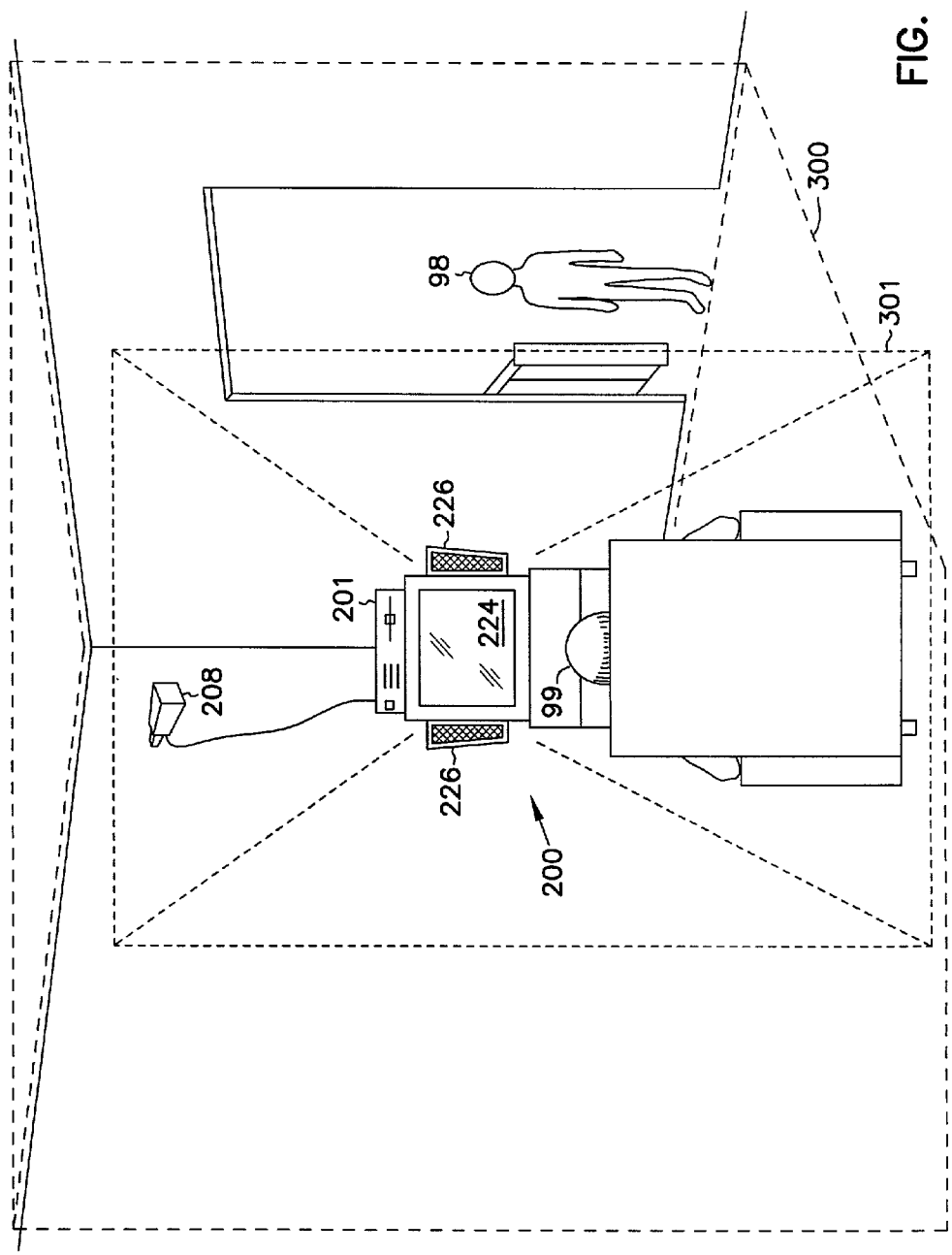
FIG. 3 is a representation of a user-based control system 200 in a home environment.

FIG. 3 is a representation of a user-based control system 200 in a home environment. Volume 300 represents the volume being monitored by user-recognition input device 208 that determines the users present in volume 300 (i.e., herein, this is also called the "area" being monitored). User 99, for example an adult watching a television program or internet web site suitable only for adults, is in an area (or volume) 301 which can view display 224 and hear speakers 226 as controlled by system unit 201. Monitored volume 300 may or may not be coterminous with viewing volume 301 (in various embodiments, it is desirable to monitor a volume 300 that is outside the viewing volume, e.g., the doorway or hall outside the room, in order to determine when someone is coming; while in other embodiments, it is desirable to repeatedly monitor which persons are present in an audience). User 98, for example a child of tender years unexpectedly enters the room because he cannot sleep. System 200 automatically controls the program content to match a content suitable for the entire audience present, e.g., by blocking the display and audio if the content is not suitable for children.

In various embodiments, user-recognition input device 208 is implemented as a motion detector or light-beam-interruption device that determines whether a person is entering the monitored area (in one such simple system, the mere presence of an additional person triggers the display-control means to change the display, e.g., blanking the screen or changing the channel), and in other embodiments, a video camera or other similar imaging device is used, and one or more images is analyzed, in one embodiment, to determine motion (to determine whether a person has entered the volume 300) or, in another embodiment, to determine the identity of the new person by facial recognition, height determination, hair color determination, or other image-analysis means. Thus, in some embodiments, the mere presence of an additional person triggers the display control. In other embodiments, image recognition and/or pattern matching is used to determine which persons are present at any given time, and display control based on the information content and on the set of persons present is used to activate the display control (e.g., display blanking or channel changing if a person is present for whom the content of the channel being watched or originally designated is not suitable). In one embodiment, the channel selection mechanism is controlled, such that unsuitable channels are skipped or not enabled when persons are present for whom the content is not suitable. In another embodiment, the channels are enabled, but the picture display and sound output are blocked or skipped (in one such embodiment, the blocking or skipping is done on a segment-by-segment, scene-by-scene, or second-by-second basis, blocking or skipping only so much as needed for the audience present).

In one embodiment, user 99 trains or programs system 200 by providing a list of persons and a rating of content suitable for each of those persons (a person rating). In one such embodiment, the pattern-matching or image recognition software is also "trained" such that a set of pattern-matching or image recognition parameters is also associated with each person on the list. In one such embodiment, the programming content (e.g., the television programming or internet site information) is also tagged with one or more content rating parameters matched to the programming content (a content rating). System 200 then monitors the persons present and compares each persons person rating to the current content rating of the programming content, and allows or blocks/skips/changes the content accordingly.

Yet another aspect of the present invention provides a method for controlling access to information based on content of the information and user identity. The method includes the steps of displaying video information, determining that an additional user is present in a given area having access to the display, storing information that identifies a video content that is being displayed on the video display, and information specifying which users are to be permitted access to that content, comparing compares a user-identity value from the input device to the memory content specifying which specifies which users are to be permitted access to that content and producing an access-allowed indication based on that comparison, and selectively blocking display of the content based on the access-allowed indication.

In one embodiment of the method, the video content is television programming. In another embodiment of the method, the video content is computer-displayed text or graphics.

In one embodiment of the method, the step of determining includes acquiring video input, and performing feature recognition to distinguish between two or more users based on one or more video features of the users.

In another embodiment of the method, the step of determining includes acquiring audio input, and performing feature recognition operable to distinguish when an additional user arrives.

In yet another embodiment of the method, the step of determining includes detecting movement to distinguish when an additional user arrives.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus for controlling access to information based on content of the information and user identity comprising:
   a video display that displays the information to be viewable by one or more users;
   a user-recognition input device that determines, when at least one user is already present in a viewing volume having access to the display, whether an additional user is newly present in the viewing volume, said user-recognition input device including an audio input device for substantially continuously detecting sounds in said viewing volume, and an audio feature recognition device configured to substantially continuously process said sounds to enable said user-recognition input device to determine when said additional user arrives in said viewing volume; and
   a control device coupled to the user-recognition input device and to the video display that selectively controls display of the information based on an output from the user-recognition device.

2. The apparatus according to claim 1, wherein the user-recognition input device includes a imaging input device, and a feature recognition device operable to distinguish between two or more users based on one or more image features of the users.

3. The apparatus according to claim 1, wherein the user-recognition input device includes a movement-detection device operable to distinguish when an additional user arrives.

4. The apparatus according to claim 1, wherein a priority is assigned to each user, and the control device selectively controls display based on each user's priority.

5. The apparatus according to claim 1, wherein the control device selects a predetermined channel based on a determination by the user-recognition device.

6. An apparatus for controlling access to information based on content of the information and user identity comprising:
   a video display;
   a user-recognition input device that identifies a plurality of users present in a viewing volume having access to the display and provides one or more values that correspond to the identities of the users, said user-recognition input device including an audio input device for substantially continuously detecting sounds in said viewing volume, and an audio feature recognition device configured to substantially continuously process said sounds to enable said user-recognition input device to determine when an user arrives in said viewing volume;
   a memory containing information that identifies a video content that is being displayed on the video display, and information specifying which users are to be permitted access to that content;
   a processor that compares a user-identity value from the input device to the memory content specifying which of the users are to be permitted access to that content and that produces an access-allowed indication based on that comparison; and
   a blocking device coupled to the processor that selectively blocks display of the content based on the access-allowed indication wherein display is blocked if any present user is not allowed access to the content.

7. The apparatus according to claim 6, wherein the video content includes television programming.

8. The apparatus according to claim 6, wherein the video content includes computer-displayed text or graphics.

9. The apparatus according to claim 6, wherein the user-recognition input device includes a video input device, and a feature recognition device operable to distinguish between two or more users based on one or more video features of the users.

10. The apparatus according to claim 6, wherein the user-recognition input device includes a movement-detection device operable to distinguish when an additional user arrives.

11. A method for controlling access to information based on content of the information and user identity comprising the steps of:
   displaying video information;
   determining that a user is newly present with at least one further user in a viewing volume having access to the display of video information, including substantially continuously acquiring audio input signals from said viewing volume, and substantially continuously performing feature recognition on the audio input signals to determine when said newly present user arrives in said viewing volume;
   storing information that identifies a video content that is being displayed on the video display, and information specifying which users are to be permitted access to that content;

comparing a user-identity value from the input device to the memory content specifying which users are to be permitted access to that content and producing an access-allowed indication based on a permitted access comparison; and selectively controlling display of the content based on the access-allowed indication.

12. The method according to claim 11, wherein the video content includes television programming.

13. The method according to claim 11, wherein the video content includes computer-displayed text or graphics.

14. The method according to claim 11, wherein the step of determining includes acquiring video input, and performing feature recognition to distinguish between two or more users based on one or more video features of the users.

15. The method according to claim 11, wherein the step of determining includes detecting movement to distinguish when an additional user arrives.

16. A method for controlling access to information based on content of the information and user identity comprising the steps of:

outputting the information in a form discernable to a user;

determining, when at least one user is already present in a viewing volume having access to the information, that an additional user is newly present in the viewing volume, including substantially continuously acquiring audio input signals from said viewing volume, and substantially continuously performing feature recognition on the audio input signals to determine when the additional user arrives in the viewing volume; and selectively blocking output of the information based on whether the additional user is newly present.

17. The method according to claim 16, wherein the step of determining includes acquiring video input, and performing feature recognition to distinguish between two or more users based on one or more video features of the users.

18. The method according to claim 16, wherein the step of determining includes detecting movement to distinguish when an additional user arrives.

19. The method according to claim 16, wherein the step of determining includes determining the identity of a second user who has appeared, and assigning a priority to the second user, and based on the assigned priority of the second user, switching to a channel assigned to the assigned priority of the second user.

20. An apparatus for controlling access to information comprising:

a display device that displays the information viewable by one or more people;

a recognition device that determines the identity of a plurality of people in a viewing volume where the information is viewable on the display device, said recognition device including an audio input device for substantially continuously detecting sounds in said viewing volume, and an audio feature recognition device configured to substantially continuously process said sounds to enable said recognition device to determine when an additional user arrives in said viewing volume;

a control device coupled to the recognition device and to the video display that selectively blocks display of the information based on information content type and predetermined access controls for each identified person, wherein display is blocked if any person present in the viewing volume is not allowed access to the content.

21. The apparatus according to claim 20, wherein the recognition device includes a imaging input device, and a feature recognition device operable to distinguish between two or more people based on one or more image features.

22. The apparatus according to claim 20, wherein the recognition device includes a movement-detection device operable to distinguish when an additional person arrives in the viewing volume.

23. The apparatus according to claim 20, wherein a priority is assigned to each person, and the control device selectively blocks display based on each person's priority.

24. The apparatus according to claim 20, wherein the control device selects a predetermined channel based on a determination by the recognition device.

25. A method for controlling access to information based on content of the information and user identity, the method comprising:

displaying video information;

identifying a plurality of users present in a viewing volume having access to the display of video information, including substantially continuously acquiring audio input signals from said viewing volume, and substantially continuously performing feature recognition on the audio input signals to determine when an additional user arrives in the viewing volume;

obtaining information that identifies content that is being displayed on the video display, and information specifying which users are to be permitted access to that content;

comparing each identified user to the information specifying which users are to be permitted access to that content; and selectively blocking display of the content based on the comparison.

26. The method according to claim 25, wherein the video content includes television programming.

27. The method according to claim 25 wherein the information that identifies content comprises a rating for a program.

28. The method according to claim 27 wherein portions of the program are individually rated and selectively blocked.

29. The method according to claim 25, wherein the video content includes computer-displayed text or graphics.

30. The method according to claim 25, wherein the identifying comprises acquiring video input, and performing feature recognition to distinguish between two or more users based on one or more video features of the users.

31. The method according to claim 25, wherein identifying comprises detecting movement to distinguish when an additional user arrives.

32. A device for controlling access to information based on content of the information and user identity, the device comprising:

means for making information viewable or audible;

identifying means for identifying a plurality of users present in a volume where such information is viewable or audible, said identifying means comprising means for substantially continuously acquiring audio input and means for substantially continuously performing audio feature recognition to determine when an additional user arrives in the viewing volume;

means for obtaining information that identifies content that is being made viewable or audible, and information specifying which users are to be permitted access to that content;

means for comparing each identified user to the information specifying which users are to be permitted access to that content; and means for selectively blocking making information viewable or audible based on the comparison.

33. The device of claim 32 wherein the means for identifying each user present in a given area provides an identity selected from the group consisting of specific identity, criteria identity, exclusionary identity and presence identity.

34. The device of claim 32 wherein the means for identifying each user present in a given area comprises an image recognition device.

35. The device of claim 32 wherein display is blocked if any present user is not allowed access to the content.

* * * * *